United States Patent
Li et al.

(10) Patent No.: US 8,018,495 B2
(45) Date of Patent: Sep. 13, 2011

(54) IMAGE CAPTURING APPARATUS WITH MOVEMENT COMPENSATION FUNCTION AND METHOD FOR MOVEMENT COMPENSATION THEREOF

(75) Inventors: Yun-Chin Li, Banciao (TW); Chin-Lung Yang, Toufen Township, Miaoli County (TW); Shih-Chang Han, Taipei (TW)

(73) Assignee: Altek Corporation, Hsinchu (TW)

( * ) Notice: Subject to any disclaimer, the term of this patent is extended or adjusted under 35 U.S.C. 154(b) by 539 days.

(21) Appl. No.: 12/232,932

(22) Filed: Sep. 26, 2008

(65) Prior Publication Data

US 2009/0087173 A1     Apr. 2, 2009

(30) Foreign Application Priority Data

Sep. 28, 2007   (TW) ................................ 96136142 A

(51) Int. Cl.
*H04N 5/228* (2006.01)

(52) U.S. Cl. ................ 348/208.6; 348/208.12

(58) Field of Classification Search ............... 348/208.4, 348/208.6, 208.12
See application file for complete search history.

(56) References Cited

U.S. PATENT DOCUMENTS

| 7,538,794 B2 * | 5/2009 | Turley et al. ............... 348/208.1 |
| 2008/0166115 A1 * | 7/2008 | Sachs et al. ..................... 396/55 |
| 2008/0170124 A1 * | 7/2008 | Hatanaka et al. .......... 348/208.4 |

* cited by examiner

*Primary Examiner* — W. B. Perkey
(74) *Attorney, Agent, or Firm* — Rosenberg, Klein & Lee

(57) ABSTRACT

A method for compensating movement of an image capturing apparatus is applied in a photographing mode whose exposure time is greater than the safe shutter time. The method includes the steps of: capturing a long exposure image under the desired exposure time and a short exposure image with an exposure time smaller than or equal to the safe shutter time, and recording a camera motion signal in the exposure time of the long exposure image. The image-shift signal is used to reconstruct the short exposure image and form a reconstructed image, and an image analyzing algorithm is utilized to extract the reconstructed image and the short exposure image of a different frequency component. Finally, different frequency components of the image are fused according to the specific ratios to produce a clear output image.

19 Claims, 3 Drawing Sheets

IMAGE CAPTURING APPARATUS WITH MOVEMENT COMPENSATION FUNCTION AND METHOD FOR MOVEMENT COMPENSATION THEREOF

BACKGROUND OF THE INVENTION

1. Field of the Invention

The present invention relates to an image capturing apparatus, and more particularly to an image capturing apparatus with a movement compensation function and its movement compensation method to prevent any blurred image caused by involuntary hand movements.

2. Description of Related Art

As digital camera technology advances, more attention is paid to the technology for correcting blurred images caused by movement of the camera. The present digital camera stabilization technology is basically divided into two categories, respectively: an optical sensing mechanism and a software compensation mechanism to compensate for involuntary hand movements.

The principle of the optical sensing mechanism mainly utilizes a camera lens and a charge coupled device for its processing, and the sensing result of a motion sensor is used to control the module of camera lens or charge coupled device to compensate the movements of the camera. For the control of camera lens, the principle of a floating lens is adopted and a motion sensor is provided for detecting any movement or deviation. After a movement correction element calculates the deviation, the camera lens is driven to correct the optical axis and maintain a stable viewing screen. This advantage helps users to take sharp pictures. However, the stabilization effect is not significant (because the lens does not have sufficient space for its movement.) For the control of charge coupled device, similarly, a motion sensor is provided for detecting any movement or deviation, and a mechanical stand floating principle is adopted to adjust and correct the position of the charge coupled device to offset the blur of an image caused by camera movements. This stabilization effect is better than the effect by controlling the camera lens, but this design can give a lower quality of pictures only. Furthermore, this kind of stabilization mechanism must work together with a charge coupled device having a higher pixel resolution in practical applications, or else the picture may have blurs and poor quality even though it can provide a stable screen.

However, the stabilization technology of the aforementioned optical sensing mechanism comes with a complicated mechanism and incurs a high price, and thus such technology is generally applied in high-end cameras. For low-end light and thin cameras, the optical sensing mechanism obviously is not suitable for the low-end cameras in considering the mechanism and cost, and thus a common software compensating mechanism (commonly known as electronic image stabilization) is introduced.

The principle of the software compensating mechanism primarily uses a motion sensor to record the movement or vibration of a camera during the photographing process and provide information for recovering the image, which constitutes a post-processing technique for a single image captured by the camera. However, the general post-processing technique for a single image creates different image recovering qualities by different degrees of movements. Furthermore, the image recovering quality is affected by noise, and thus the actual final effect is not good enough, and blurred images and noise cannot be overcome easily for an optimization.

SUMMARY OF THE INVENTION

In view of the foregoing shortcoming of the prior art, the primary objective of the present invention is to overcome the shortcomings of the prior art by integrating a multi-exposure capturing method, recording different image information for the same scene, and using an image analysis method to extract different frequency components of the captured images for the final image fusion or stacking. The quality of the fused image is better than that of individual captured image either in the signal to noise ratio (S/N) or sharpness. Therefore, it provides a stabilization method for reducing blurred image capture.

To achieve the foregoing objective, the present invention provides an image capturing apparatus with a movement compensation function, and the apparatus provides movement compensation in a photographing mode having an exposure time greater than the safe shutter time. The image capturing apparatus comprises an image capturing unit, a buffer unit, a motion sensor and a processing unit, wherein the image capturing unit is provided for receiving a release signal to capture a first image under a desired exposure time followed by a second image with an exposure time smaller than or equal to the defined safe shutter time, and the buffer unit is coupled between the motion sensor and the processing unit for buffering the first image and the second image. The motion sensor is provided for recording a camera motion signal of the image capturing apparatus during the exposure time of the first image. Finally, the processing unit reconstructs the first image according to the camera motion signal to form a reconstructed image, and extract different frequency components from the reconstructed image and the second image, and performing a fusing process for the different frequency components of the two images according to a specific ratio to generate an output image. In general, the first image captured in a relatively long exposure time is prone to be a blurred image, and the second image captured in a relatively short exposure time is a sharp but noisy image.

To achieve the foregoing objective of the present invention, the present invention provides a method for compensating movement of an image capturing apparatus, and the method is applied in a photographing mode having an exposure time greater than the safe shutter time, and comprises the steps of: capturing a first image under the desired exposure time and a second image with an exposure time smaller than or equal to the safe shutter time; recording an camera motion signal of the image capturing apparatus during the exposure period of the first image; reconstructing the first image according to the camera motion signal to form a reconstructed image; using an image analyzing skill for the reconstructed image and the second image to extract different frequency components; and performing a fusing process according to a specific ratio for the image with different frequency components to generate an output image, so that the output image can be a clearer and less noisy image. It assures the image recovering quality can be achieved. In other words, the image capturing apparatus can obtain a clear image with less noise in a long exposure time.

To make it easier for our examiner to understand the expected objectives, technical measures and effects of the present invention, we use preferred embodiments together with the attached drawings for the detailed description of the invention, but it should be pointed out that the attached drawings are provided for reference and description only, but not for limiting the present invention.

DETAILED DESCRIPTION OF THE PREFERRED EMBODIMENTS

Figure 1:
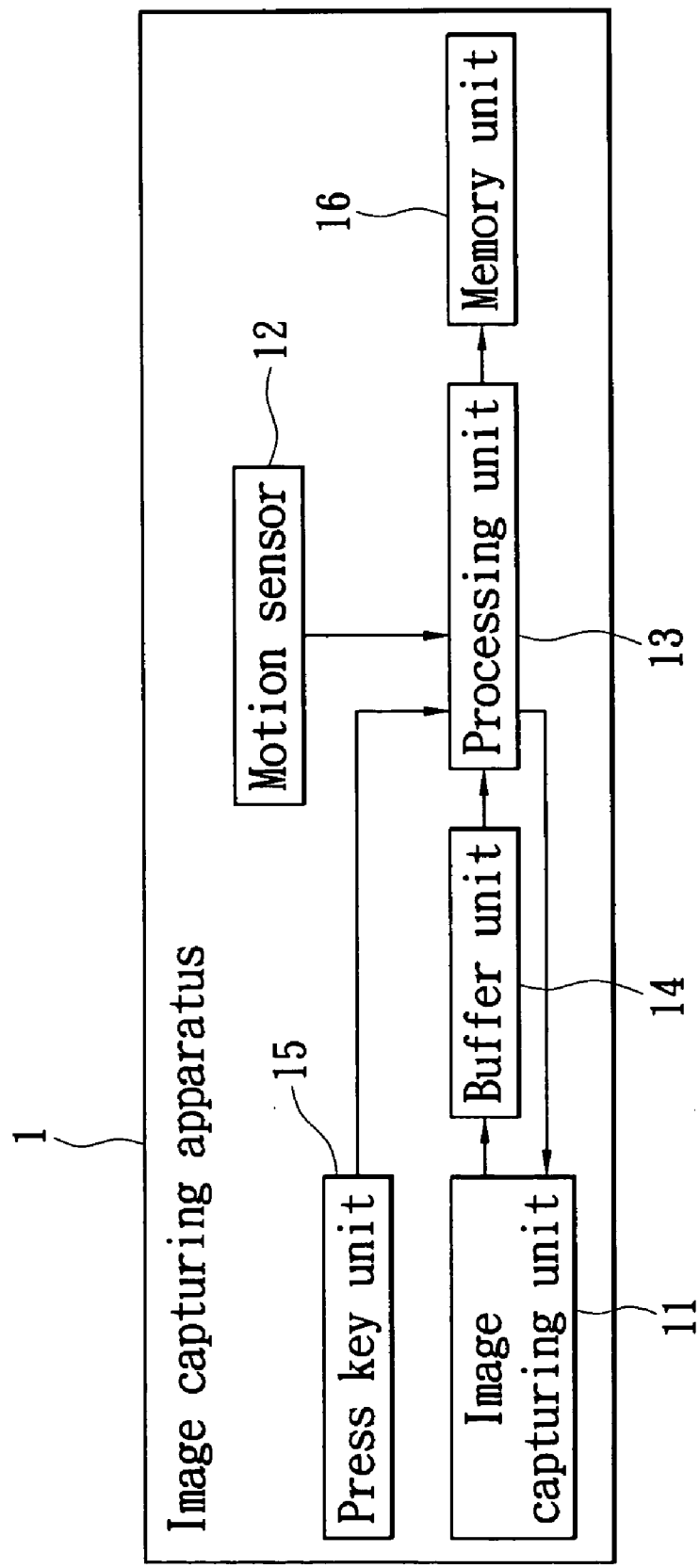
FIG. 1 is a block diagram of an image capturing apparatus with a movement compensation function in accordance with a preferred embodiment of the present invention.

Referring to FIG. 1 for a block diagram of an image capturing apparatus with a movement compensation function in accordance with a preferred embodiment of the present invention, the image capturing apparatus 1 comprises an image capturing unit 11, a motion sensor 12, a processing unit 13, a buffer unit 14, a press key unit 15 and a memory unit 16. If a user sets the image capturing apparatus 1 in a photographing mode greater than the safe shutter time, the image capturing apparatus 1 will provide a movement compensation function automatically to prevent any blurred image caused by a user's hand movement. The so-called safe shutter time varies with various different image capturing apparatuses 1, and generally comes with an exposure time of 1/60 second or 1/30 second. It depends on the focal length of the mounted lens. In other words, if a user takes pictures by an exposure time greater than the safe shutter time, a blurred image may be produced easily due to the long exposure time.

When using the image capturing apparatus 1, a user or the camera set the desired exposure time to a value (greater than the safe shutter time), and presses the press key unit 15 to generate a trigger signal for taking pictures. After the processing unit 13 receives the trigger signal, the processing unit 13 outputs a release signal to the image capturing unit 11. After the image capturing unit 11 receives the release signal, the image capturing unit will automatically capture two images continuously for the same scene. A first image is captured with the desired exposure time and a second image is with an exposure time smaller than or equal to the safe shutter time. In other words, the first image is captured by the image capturing unit 11 with an exposure time greater than the safe shutter time and a longer exposure time, and thus a motion-blurred image will be produced easily. The second image is captured by an exposure time smaller than the safe shutter time and with a shorter exposure time, and thus a sharp image filled with noise will be formed. The value of exposure time smaller than or equal to the safe shutter time is a factory default setting of the image capturing apparatus 1 and the exposure time is designed according to different safe shutter times of the image capturing apparatuses 1, and the exposure time is not limited in this embodiment.

The motion sensor 12 is provided for recording a camera motion signal of the image capturing apparatus 1 during the exposure period of the first image, wherein the motion sensor 12 functions by means of a gyroscope. In addition, the buffer unit 14 is coupled between the image capturing unit 11 and the processing unit 13 for buffering a first image and a second image captured by the image capturing unit 11 for the access of images by the processing unit 13.

Since the processing unit 13 is coupled with the motion sensor 12, the processing unit 13 reconstructs the first image according to the camera motion signal recorded by the motion sensor 12 to recover a clearer image to form a reconstructed image. In an actual design, the processing unit 13 uses a point spread function (PSF) derived from the signal of motion sensor 12 to reconstruct the first image into the reconstructed image.

The processing unit 13 uses an image analyzing algorithm to extract images of different frequency components from the reconstructed image and the second image for processing the images and perform a fusing process according to a specific ratio to generate an output image. The aforementioned image analyzing algorithm refers to an algorithm for extracting an image of low frequency components from the reconstructed image and an image of high frequency components of the second image, and performing a fusing process of an image of low frequency components from the reconstructed image and an image of high frequency components of the second image according to a specific ratio to synthesize the output image. In addition, the image analyzing algorithm further extracts an image of high frequency components from the reconstructed image, such that before an image of the low frequency components is fused, the image of the low frequency components is combined with an image of high frequency components of the second image in advance according to a waveform relation to provide a higher accuracy for the image of high frequency components required for the fusion. The specific ratio can be adjusted arbitrarily by the processing unit 13 according to the value of the desired exposure time which is smaller than or equal to the safe shutter time, and the fusing process relates to a summation fusion computing method.

For example, the method for adjusting the specific ratio can be produced by consulting a lookup table. In other words, the ratios are indexed by the value of a desired exposure time and the extent of movement (PSF) of a camera. The ratios correspond to a certain percentage (X %) required for the image of high frequency components (A) and a certain percentage (Y %) required for an image of low frequency components (B) extracted from the reconstructed image. The summation fusion is performed to produce the output image (C), and the result is shown in the formula C=(A*X %)+(B*Y %).

A general color image can be divided into luminance and chrominance, and luminance belongs to a higher frequency component and chrominance belongs to a lower frequency component. Therefore, we can simply capture the luminance of an image captured with short exposure and the chrominance of an image captured with long exposure to fuse and form an image with less noise and correct colors, or a majority of luminance signals of images captured with short exposure is fused with a minority of luminance signals of images captured with long exposure, and then merged with a majority of chrominance signals of images captured with long exposure for the merge.

Finally, the memory unit 16 is coupled to the processing unit 13 for storing an output image finally produced by the processing unit 13. In other words, the output image is an image actually provided to users after the blur of the image is reduced by the movement compensation function of the image capturing apparatus 1, and the output image has a relatively high image recovering quality.

Figure 2:
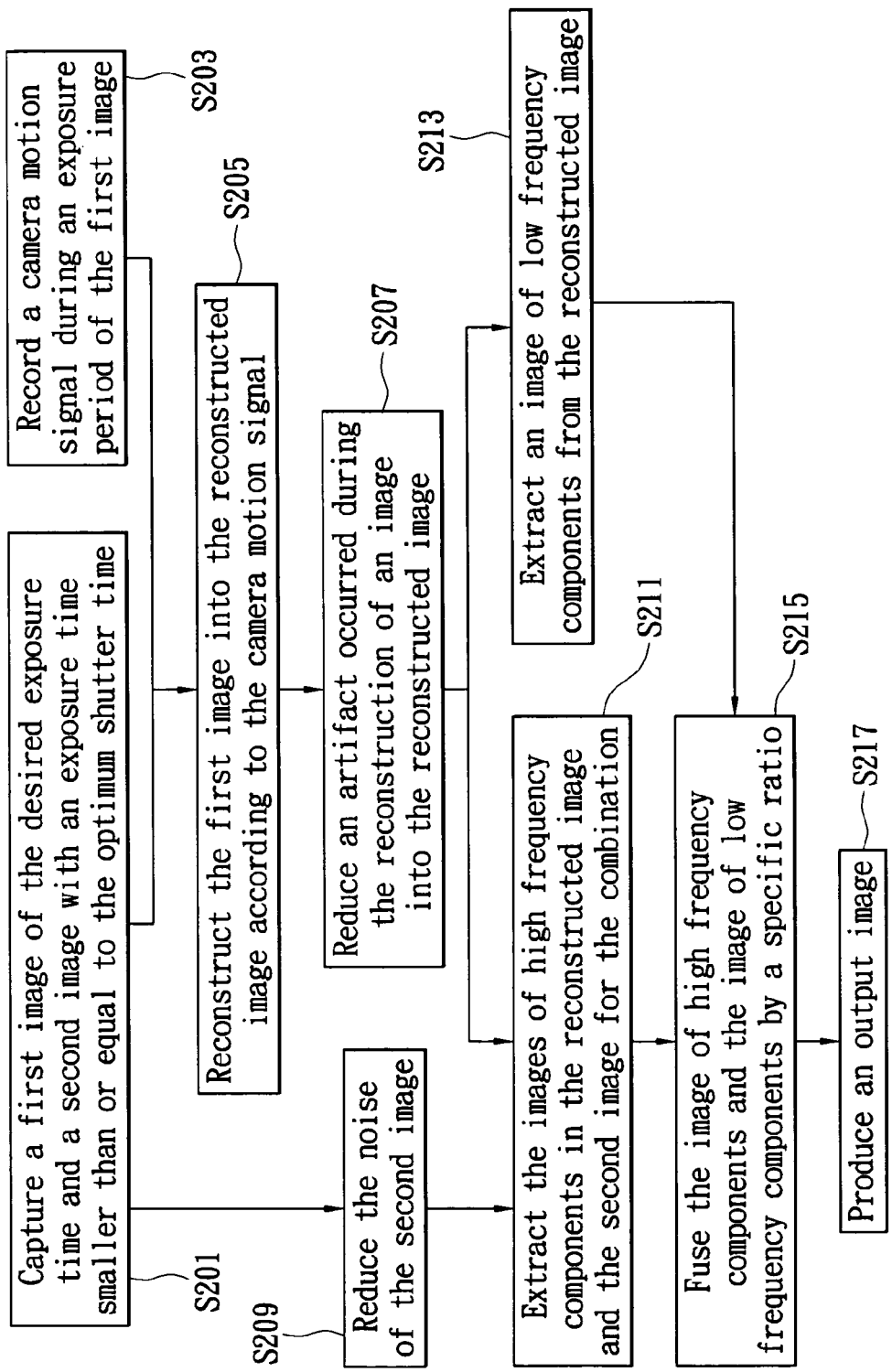
FIG. 2 is a flow chart of a method for compensating movement of an image capturing apparatus in accordance with a preferred embodiment of the present invention.

Refer to FIG. 2 for a flow chart of a method for compensating movement of an image capturing apparatus in accordance with a preferred embodiment of the present invention. In the movement compensation method, if a user sets the desired exposure time of the image capturing apparatus 1 to a photographing mode having an exposure time greater than the safe shutter time, and the image capturing apparatus 1 performs the movement compensation function automatically. The method comprises the following steps: if a user presses the press key unit 15 to take a picture, the image capturing apparatus 1 will continuously capture a first image under the desired exposure time and a second image with an exposure time smaller than or equal to the safe shutter time (S201), while recording an camera motion signal of the image capturing apparatus 1 during the exposure period of the first image (S203).

The point spread function is used directly for reconstructing the first image into the reconstructed image according to the camera motion signal (S205), and further executing an artifact reduction to reduce any artifact occurred during the reconstruction of an image into the reconstructed image (S207). After the second image is captured in Step (S201), the second image is a sharp image but filled with noise, and thus a noise reduction is performed to reduce the noise of the second image (S209).

After Steps (S207) and (S209) are completed, the image analyzing algorithm is used to extract the images of high frequency components in the reconstructed image and the second image (S211). On the other hand, the image analyzing algorithm is used to extract an image of low frequency components from the reconstructed image synchronously (S213).

Finally, the image of high frequency components and the image of low frequency components produced in Steps (S211) and (S213) respectively are used to obtain a specific ratio to perform a summation fusion (S215) to produce the final expected clear output image (S217).

Figure 3:
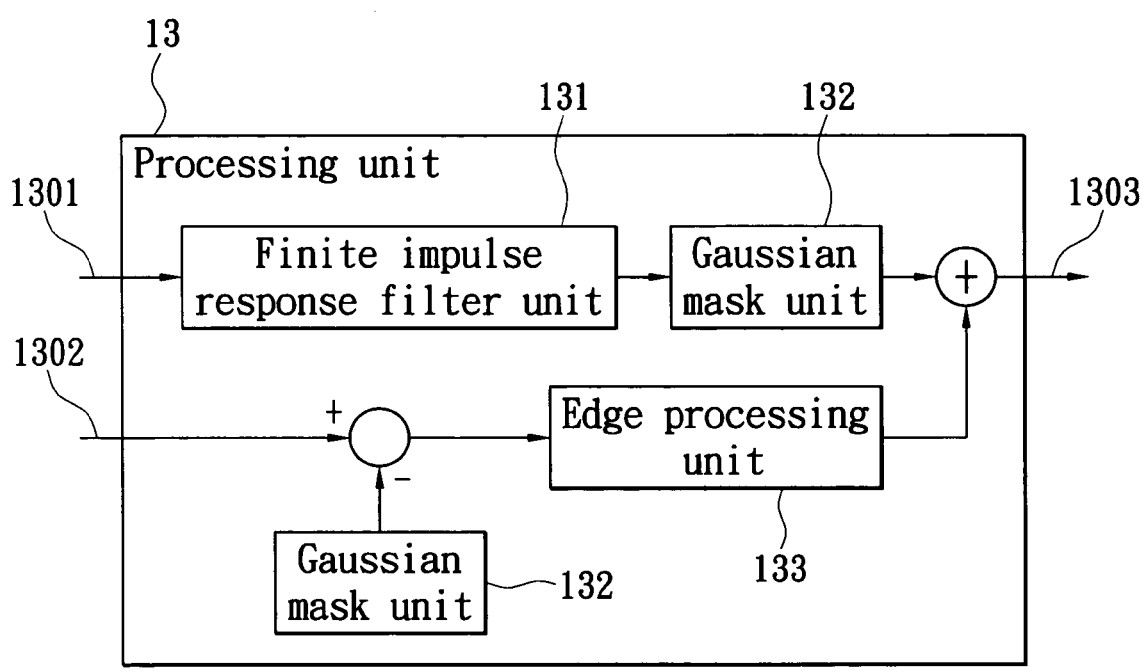
FIG. 3 is a schematic view of a processing unit of an image capturing apparatus in accordance with a preferred embodiment of the present invention.

Referring to FIG. 3 for the illustration of a design of the portion in the processing unit 13 of the present invention, the processing unit 13 reads a first image 1301 and a second image 1302 from the buffer unit 14. For the first image 1301, the first image 1301 is an image captured by an exposure time greater than the safe shutter time, and thus the image may be a motion-blurred image. Therefore, the processing unit 13 performs a point compensating computation by a finite impulse response (FIR) filter unit 131 to reconstruct the image into a the reconstructed image by the point spread function (having the capability of distinguishing two pixels in an image). A Gaussian mask unit 132 is used to perform a fuzzy computation from the reconstructed image to eliminate the high frequency components (ringing artifact) from the reconstructed image and obtain an image of low frequency component.

For the second image 1302, the second image 1302 is an image captured by an exposure time smaller than or equal to the safe shutter time, and thus the image is a sharp image filled with noise, and we need to employ the image of high frequency components of the second image 1302. The processing unit 13 performs a fuzzy process for the second image 1302 by a Gaussian mask unit 132 to extract an image of low frequency component, and then deduct the image of low frequency components of the second image 1302 from the original second image 1302 to obtain an image of high frequency components of the second image 1302. Further, the processing unit 13 performs an edge process for the image of high frequency components of the second image 1302 through an edge processing unit 133. The image of high frequency components of the second image 1302 is processed to remove small edges or sparse noise, and the edge processing effect is enhanced to obtain a more accurate image of high frequency components of the second image 1302.

Finally, the processing unit 13 fuses an image of the low frequency components from the reconstructed image with an image of high frequency components of the second image 1302 to obtain the required output image 1303.

It is noteworthy to point out that the processing unit 13 is one of the designs of the present invention, but not intended to limit the scope of the present invention. For example, an image of high frequency components from the reconstructed image and an image of high frequency components of the second image 1302 are obtained and combined, and the combined images are processed by an edge processing unit 133, and finally fused with an image of the low frequency components from the reconstructed image to obtain a clear output image 1303.

In summation of the description above, the present invention provides an image capturing apparatus with a movement compensation function, and the movement compensation method not only assures a high image recovering quality, such that the image capturing apparatus achieves the stabilization effect for preventing a blurred image occurred when taking a picture in a long exposure time, as well as obtaining a clear image with less noise, but also greatly changes the hardware design of the circuits for providing a better way of processing and handling the blurred images and noise.

Although the present invention has been described with reference to the preferred embodiments thereof, it will be understood that the invention is not limited to the details thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. An image capturing apparatus with a movement compensation function, applied in a photographing mode whose exposure time is greater than the safe shutter time for providing the movement compensation function, comprising:
    an image capturing unit, for receiving a release signal to capture a first image under a desired exposure time and a second image with an exposure time smaller than or equal to the safe shutter time;
    a motion sensor, for recording a camera motion signal of the image capturing apparatus during the exposure period of the first image; and
    a processing unit, for outputting the release signal, and reconstruct the first image to form a reconstructed image according to the camera motion signal, and using an image analyzing algorithm to extract an image of different frequency components from the reconstructed image and the second image, and performing a fusing process to the image of different frequency components according to a specific ratio to generate an output image.

2. The image capturing apparatus with a movement compensation function as recited in claim 1, further comprising a press key unit coupled to the processing unit for generating a trigger signal to trigger the processing unit to output the release signal.

3. The image capturing apparatus with a movement compensation function as recited in claim 1, further comprising a buffer unit coupled between the image capturing unit and the processing unit for buffering the first image and the second image to be accessed by the processing unit.

4. The image capturing apparatus with a movement compensation function as recited in claim 1, further comprising a memory unit coupled to the processing unit for storing the output image.

5. The image capturing apparatus with a movement compensation function as recited in claim 1, wherein the first image is captured in a long exposure by the image capturing unit to form a non-focusing blurred image, the second image is captured in a short exposure by the image capturing unit to form a sharp clear image filled with noise.

6. The image capturing apparatus with a movement compensation function as recited in claim 1, wherein the processing unit uses a point spread function according to the camera motion signal to reconstruct the first image to recover the clarity of the first image to form the reconstructed image.

7. The image capturing apparatus with a movement compensation function as recited in claim 1, wherein the image analyzing algorithm extracts an image of low frequency components from the reconstructed image and an image of high frequency components of the second image, and performs a fusing process according to the specific ratio for the image of low frequency components from the reconstructed image and the image of high frequency components of the second image to generate the output image.

8. The image capturing apparatus with a movement compensation function as recited in claim 7, wherein the image analyzing algorithm further extracts an image of high frequency components from the reconstructed image, such that the image of high frequency components of the second image is fused with the image of high frequency components from the reconstructed image in advance.

9. The image capturing apparatus with a movement compensation function as recited in claim 7, wherein the specific ratio is adjusted by the processing unit according to the settings of the desired exposure time and an exposure time smaller than or equal to the safe shutter time.

10. The image capturing apparatus with a movement compensation function as recited in claim 7, wherein the fusing process is a summation fusion.

11. A method for compensating movement of an image capturing apparatus, applied in a photographing mode having an exposure time greater than the safe shutter time, comprising the steps of:
    capturing a first image under a desired exposure time and a second image with an exposure time smaller than or equal to the safe shutter time;
    recording a camera motion signal of the image capturing apparatus during the exposure period of the first image;
    reconstructing the first image to form a reconstructed image according to the camera motion signal; and
    using an image analyzing algorithm to extract images of different frequency components from the reconstructed image and the second image, and
    perform a fusing process to the images of different frequency components to generate an output image according to a specific ratio.

12. The method for compensating movement of an image capturing apparatus as recited in claim 11, wherein the first image is captured by a long exposure to form a non-focusing blurred image, and the second image is captured by a short exposure to form a sharp clear image filled with noise.

13. The method for compensating movement of an image capturing apparatus as recited in claim 11, further comprising the step of executing a noise reduction procedure to reduce the noise of the second image, after the second image is capture.

14. The method for compensating movement of an image capturing apparatus as recited in claim 11, wherein the reconstruction step executes a point spread function according to the camera motion signal to reconstruct the first image to recover the clarity of the first image to form the reconstructed image.

15. The method for compensating movement of an image capturing apparatus as recited in claim 14, further comprising the step of executing an artifact reduction procedure to reduce an artifact produced during the reconstruction from the reconstructed image after the reconstruction step.

16. The method for compensating movement of an image capturing apparatus as recited in claim 11, wherein the image analyzing algorithm extracts an image of low frequency components from the reconstructed image and an image of high frequency components of the second image, and performs a fusing process according to the specific ratio for the image of low frequency components from the reconstructed image and the image of high frequency components of the second image.

17. The method for compensating movement of an image capturing apparatus as recited in claim 16, wherein the image analyzing algorithm further extracts an image of high frequency components from the reconstructed image, and fuses an image of high frequency components of the second image.

18. The method for compensating movement of an image capturing apparatus as recited in claim 16, wherein the specific ratio is adjusted according to the settings of the desired exposure time and an exposure time smaller than or equal to the safe shutter time.

19. The method for compensating movement of an image capturing apparatus as recited in claim 16, wherein the fusing process is a summation fusion.

\* \* \* \* \*